(12) United States Patent
Fujishiro et al.

(10) Patent No.: US 10,425,896 B2
(45) Date of Patent: Sep. 24, 2019

(54) COMMUNICATION CONTROL METHOD AND BASE STATION

(71) Applicant: KYOCERA CORPORATION, Kyoto (JP)

(72) Inventors: Masato Fujishiro, Yokohama (JP); Katsuhiro Mitsui, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 108 days.

(21) Appl. No.: 15/114,305

(22) PCT Filed: Jan. 28, 2015

(86) PCT No.: PCT/JP2015/052305
§ 371 (c)(1),
(2) Date: Jul. 26, 2016

(87) PCT Pub. No.: WO2015/115457
PCT Pub. Date: Aug. 6, 2015

(65) Prior Publication Data
US 2017/0006547 A1 Jan. 5, 2017

Related U.S. Application Data

(60) Provisional application No. 61/990,970, filed on May 9, 2014.

(30) Foreign Application Priority Data

Jan. 31, 2014 (JP) .................................. 2014-016966

(51) Int. Cl.
*H04W 52/02* (2009.01)
*H04W 76/27* (2018.01)
(Continued)

(52) U.S. Cl.
CPC ....... *H04W 52/0235* (2013.01); *H04L 5/0048* (2013.01); *H04L 43/16* (2013.01);
(Continued)

(58) Field of Classification Search
CPC .. H04L 43/16; H04L 5/0048; H04W 52/0235; H04W 74/0833; H04W 24/02;
(Continued)

(56) References Cited

U.S. PATENT DOCUMENTS

2003/0153370 A1* 8/2003 Sako ................. H04W 52/0245
455/574
2012/0163305 A1* 6/2012 Nimbalker ........ H04W 52/0206
370/329
(Continued)

FOREIGN PATENT DOCUMENTS

WO 2011/125849 A1 10/2011
WO 2013/044957 A1 4/2013

OTHER PUBLICATIONS

International Search Report issued in PCT/JP2015/052305; dated Apr. 28, 2015.
(Continued)

*Primary Examiner* — John D Blanton
*Assistant Examiner* — Jean F Voltaire
(74) *Attorney, Agent, or Firm* — Studebaker & Brackett PC

(57) ABSTRACT

A communication control method according to a first aspect is used in a base station that operates in a power saving mode. The communication control method includes steps of: setting a threshold; receiving an uplink signal transmitted from a user terminal connected to a neighboring base station; and starting a process of transitioning from the power saving mode to a normal mode, in response to that a received power of the uplink signal exceeds the threshold. In
(Continued)

the step of setting the threshold, the base station sets the threshold on the basis of information received from the neighboring base station.

11 Claims, 10 Drawing Sheets

(51) Int. Cl.
| | | |
|---|---|---|
| *H04W 16/32* | (2009.01) | |
| *H04W 24/02* | (2009.01) | |
| *H04L 5/00* | (2006.01) | |
| *H04L 12/26* | (2006.01) | |
| *H04W 74/08* | (2009.01) | |
| *H04W 28/08* | (2009.01) | |
| *H04W 92/20* | (2009.01) | |
| *H04W 72/04* | (2009.01) | |

(52) U.S. Cl.
CPC ........... *H04W 16/32* (2013.01); *H04W 24/02* (2013.01); *H04W 52/0206* (2013.01); *H04W 74/0833* (2013.01); *H04W 76/27* (2018.02); *H04W 28/08* (2013.01); *H04W 72/0446* (2013.01); *H04W 92/20* (2013.01); *Y02D 70/1242* (2018.01); *Y02D 70/1262* (2018.01); *Y02D 70/164* (2018.01); *Y02D 70/24* (2018.01)

(58) Field of Classification Search
CPC ............... H04W 16/32; H04W 76/046; H04W 52/0206; H04W 72/0446
USPC .......................................................... 370/311
See application file for complete search history.

(56) References Cited

U.S. PATENT DOCUMENTS

| | | | | |
|---|---|---|---|---|
| 2012/0329507 A1* | 12/2012 | Watanabe | ............. | H04W 24/10 455/517 |
| 2013/0084865 A1* | 4/2013 | Agrawal | ........... | H04W 36/0083 455/436 |
| 2013/0223317 A1* | 8/2013 | Kudo | ................ | H04W 52/0206 370/311 |
| 2013/0229942 A1* | 9/2013 | Kubota | ................. | H04W 36/22 370/252 |
| 2013/0279430 A1* | 10/2013 | Damnjanovic | ......... | H04W 8/22 370/329 |
| 2014/0087732 A1* | 3/2014 | Matsuo | ................ | H04J 11/0069 455/436 |
| 2015/0094114 A1* | 4/2015 | Rao | ..................... | H04W 52/245 455/522 |
| 2015/0358885 A1* | 12/2015 | Choi | ..................... | H04W 36/22 455/438 |
| 2016/0183147 A1* | 6/2016 | Da Silva | ........... | H04W 36/0055 370/331 |
| 2016/0255591 A1* | 9/2016 | Park | ........................ | H04W 4/70 455/522 |

OTHER PUBLICATIONS

Written Opinion issued in PCT/JP2015/052305; dated Apr. 28, 2015.

3rd Generation Partnership Project; Technical Specification Group Radio Access Network; Evolved Universal Terrestrial Radio Access (E-UTRA); Study on Energy Saving Enhancement for E-UTRAN; Aug. 2013; pp. 1-15; Release 12; 3GPP TR 36.887; V0.2.0; 3GPP Organizational Partners.

Kyocera Corp.; UE proximity detection for ES cell activation for overlaid scenario; 3GPP TSG RAN WG3 Meeting #82; R3-132299; Nov. 11-15, 2013; pp. 1-5; San Francisco, CA, USA.

Extended European Search Report issued by the European Patent Office on Nov. 28, 2017, which corresponds to EP15743429.1—1875 and is related to U.S. Appl. No. 15/114,305.

* cited by examiner

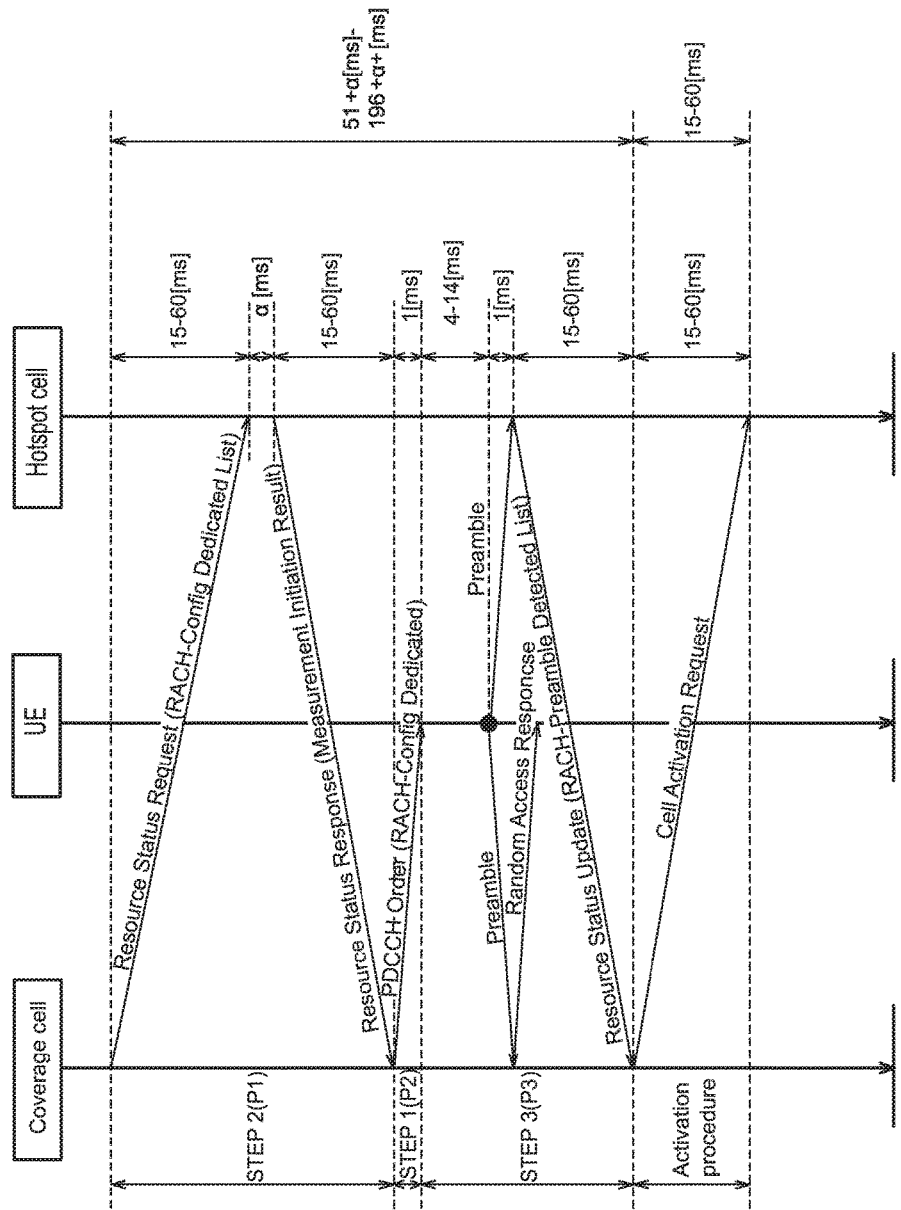

COMMUNICATION CONTROL METHOD AND BASE STATION

TECHNICAL FIELD

The present invention relates to a communication control method and a base station used in a mobile communication system.

BACKGROUND ART

According to 3GPP (3rd Generation Partnership Project), which is a project aiming to standardize a mobile communication system, a technology for power saving (energy saving), which reduces the power consumption of a network, has been introduced (for example, see Non Patent Document 1). For example, when the communication traffic is less during nighttime, a base station (a cell) is set to the power saving mode.

Moreover, according to 3GPP, in Release 12 and later, an improved energy saving technology is planned to be introduced. For example, it is assumed that in a network deployment (so-called HetNet) in which a plurality of small cells (hot spot cells) are arranged within the coverage of macro cells, the small cells are selectively set to the power saving mode or normal mode in response to the traffic status.

PRIOR ART DOCUMENTS

Non Patent Document

Non Patent Document 1: 3GPP technical report "TR 36.887 V0.2.0" Sep. 12, 2013

SUMMARY OF INVENTION

In order to operate a network effectively, in cases where there exist small cells that are in the power-saving mode, it is desirable to set, to the normal mode, only the small cell that exists in the proximity to a user terminal establishing a connection with a macro cell.

Thus, an object of the present invention is to provide a communication control method and a base station that enable an effective operation of a network.

A communication control method according to a first aspect is used in a base station that operates in a power saving mode. The communication control method includes steps of: setting a threshold; receiving an uplink signal transmitted from a user terminal connected to a neighboring base station; and starting a process of transitioning from the power saving mode to a normal mode, in response to that a received power of the uplink signal exceeds the threshold. In the step of setting the threshold, the base station sets the threshold on the basis of information received from the neighboring base station.

A communication control method according to a second aspect is used in a base station that includes a radio transmitter and a radio receiver. The communication control method includes steps of: operating in a first power saving mode in which both the radio transmitter and the radio receiver are set to an OFF state; transitioning to a second power saving mode in which the radio receiver is set to an ON state while maintaining the radio transmitter in the OFF state; and determining whether or not the radio receiver has received an uplink signal transmitted from a user terminal connected to a neighboring base station, in the second power saving mode.

A communication control method according to a third aspect is used in a base station to which a user terminal connects. The communication control method includes steps of: transmitting, to the user terminal, a preamble transmission order for ordering a transmission of a random access preamble so that a neighboring base station operating in a power saving mode is capable of detecting the user terminal; and transmitting, to the user terminal, a random access response corresponding to the random access preamble even when the random access preamble has not been received from the user terminal.

BRIEF DESCRIPTION OF DRAWINGS

FIG. 12 is a diagram illustrating an example of signaling flow of solution 3 with PRACH.

DESCRIPTION OF EMBODIMENTS

[Overview of Embodiments]

Figure 1:
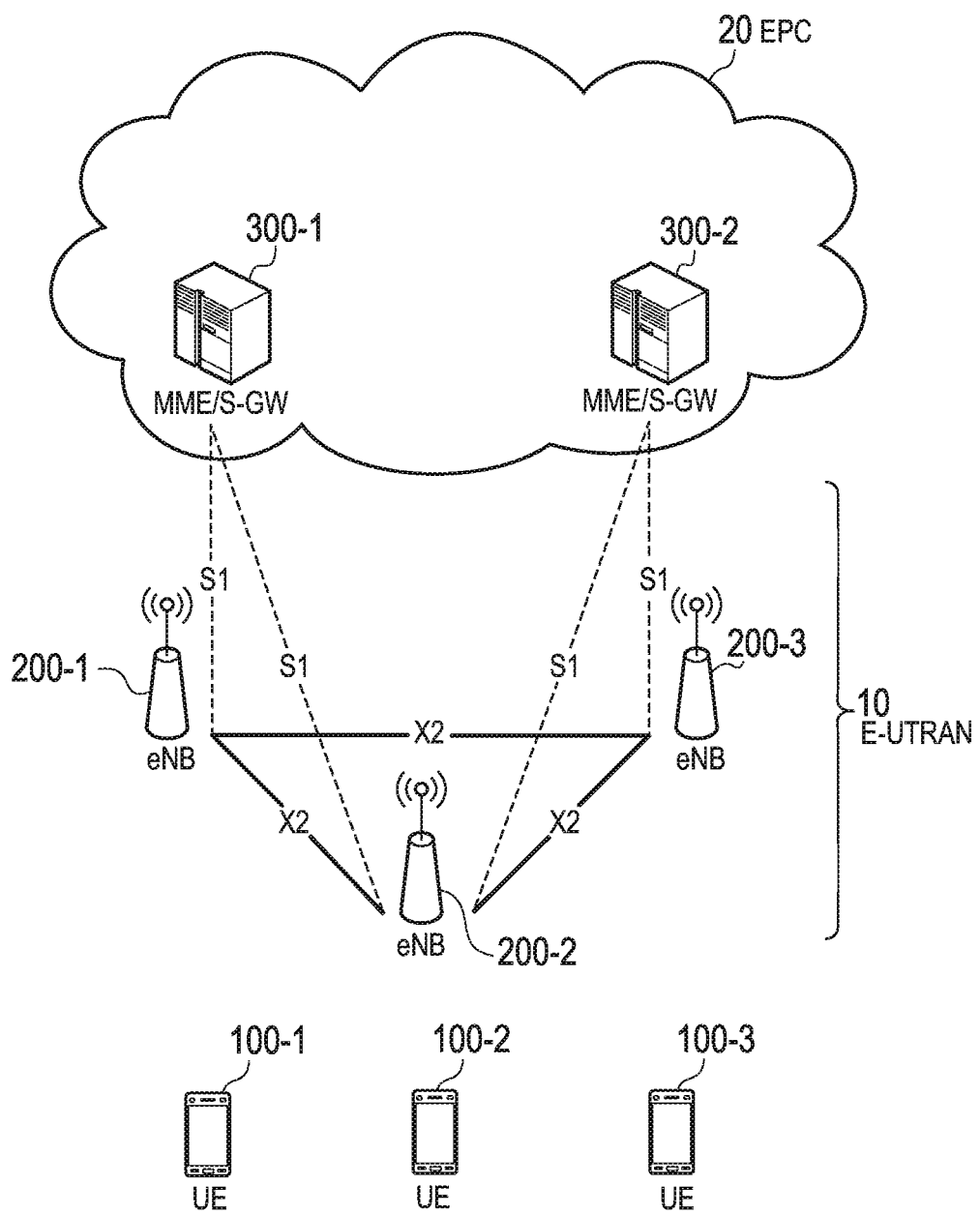
FIG. 1 is a configuration diagram of an LTE system according to a first embodiment and a second embodiment.

A communication control method according to a first embodiment is used in a base station that operates in a power saving mode. The communication control method includes steps of: setting a threshold; receiving an uplink signal transmitted from a user terminal connected to a neighboring base station; and starting a process of transitioning from the power saving mode to a normal mode, in response to that a received power of the uplink signal exceeds the threshold. In the step of setting the threshold, the base station sets the threshold on the basis of information received from the neighboring base station.

In the first embodiment, the communication control method further includes a step of receiving threshold designation information for designating the threshold, from the neighboring base station. In the step of setting the threshold, the base station sets the threshold on the basis of the threshold designation information received from the neighboring base station.

In the first embodiment, the communication method further includes steps of: determining whether or not to accept the threshold designation information; and transmitting configuration information for the uplink signal, which is applicable to the user terminal, to the neighboring base station, when it is determined that the threshold designation information is accepted.

In the first embodiment, the communication control method further includes steps of determining whether accept the threshold designation information, and transmitting a response indicating result of determination to the neighboring base station.

In a modification of the first embodiment, the communication control method further includes a step of receiving load information indicating a load status of the neighboring base station, from the neighboring base station. In the step of setting the threshold, the base station sets the threshold on the basis of the load information received from the neighboring base station.

In the first embodiment, the uplink signal is any one of a random access preamble, a sounding reference signal, and a demodulation reference signal.

A base station according to the first embodiment operates in a power saving mode. The base station includes: a receiver that receives an uplink signal transmitted from a user terminal connected to a neighboring base station; and a controller that starts a process of transitioning from the power saving mode to a normal mode, in response to that a received power of the uplink signal exceeds the threshold. The controller sets the threshold on the basis of information on the neighboring base station.

A communication control method according to a second embodiment is used in a base station that includes a radio transmitter and a radio receiver. The communication control method includes steps of: operating in a first power saving mode in which both the radio transmitter and the radio receiver are set to an OFF state; transitioning to a second power saving mode in which the radio receiver is set to an ON state while maintaining the radio transmitter in the OFF state; and determining whether or not the radio receiver has received an uplink signal transmitted from a user terminal connected to a neighboring base station, in the second power saving mode.

In the second embodiment, the communication control method further includes a step of starting a process of transitioning to a normal mode in which both the radio transmitter and the radio receiver are set to an ON state, when it is determined that the radio receiver has received the uplink signal.

In the second embodiment, the communication control method further includes a step of receiving trigger information for transitioning to the second power saving mode, from the neighboring base station. In the step of transitioning to the second power saving mode, the base station transitions to the second power saving mode in response to a reception of the trigger information.

In the second embodiment, the trigger information is any one of: information for requesting a start of reception of the uplink signal; information for requesting a switch of the radio receiver to an ON state; and configuration information for the uplink signal.

In the second embodiment, the uplink signal is any one of a random access preamble, a sounding reference signal, and a demodulation reference signal.

A base station according to the second embodiment includes a radio transmitter and a radio receiver. The base station includes a controller that operates in a first power saving mode in which both the radio transmitter and the radio receiver are set to an OFF state. The controller transitions to a second power saving mode in which the radio receiver is set to an ON state while maintaining the radio transmitter in the OFF state, and then determines whether or not the radio receiver has received an uplink signal transmitted from a user terminal connected to a neighboring base station.

A communication control method according to the second embodiment is used in a base station to which a user terminal connects. The communication control method includes steps of: transmitting, to the user terminal, a preamble transmission order for ordering a transmission of a random access preamble so that a neighboring base station operating in a power saving mode is capable of detecting the user terminal; and transmitting, to the user terminal, a random access response corresponding to the random access preamble even when the random access preamble has not received from the user terminal.

In the second embodiment, the communication control method further includes a step of determining whether or not the random access preamble has been received. The step of determining comprises steps of: receiving, from the neighboring base station, notification information indicating that the neighboring base station has received the random access preamble; and determining that the random access preamble has not been received when the random access preamble has not been received at the time of the reception of the notification information.

In the second embodiment, the communication control method further includes a step of determining whether or not the random access preamble has been received. The step of determining comprises steps of: clocking a time that has elapsed since the transmission of the preamble transmission order, and determining that the random access preamble has not been received when the random access preamble has not been received until the elapsed time reaches a predetermined time.

In the second embodiment, the communication control method further includes steps of: receiving, from the neighboring base station, information indicating a set of non-contention-based random access preambles usable by the neighboring base station; and selecting any non-contention-based random access preamble from the set. In the step of transmitting the preamble transmission order, the base station transmits the preamble transmission order including information indicating the selected non-contention-based random access preamble, to the user terminal.

In the second embodiment, the communication control method further includes steps of: receiving, from the neighboring base station, notification information indicating that the neighboring base station has received the random access preamble; and transmitting, to the neighboring base station, request information for causing the neighboring base station to transition to a normal mode on the basis of the notification information.

A base station according to the second embodiment is a base station to which a user terminal connects. The base station includes: a transmitter that transmits, to the user terminal, a preamble transmission order for ordering a transmission of a random access preamble so that a neighboring base station operating in a power saving mode is capable of detecting the user terminal; and a controller that performs control so that a random access response corresponding to the random access preamble is transmitted to the user terminal, even when the base station does not receive the random access preamble from the user terminal.

[First Embodiment]

Hereinafter, an embodiment for a case where the present invention is applied to an LTE system will be explained.

(System Configuration)

FIG. 1 is a configuration diagram of the LTE system according to the first embodiment.

As illustrated in FIG. 1, the LTE system according to the first embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell). The configuration of the UE 100 will be described later.

The E-UTRAN 10 corresponds to a radio access network. The E-UTRAN 10 includes an eNB 200 (an evolved Node-B). The eNB 200 corresponds to a base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes an MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface.

Figure 2:
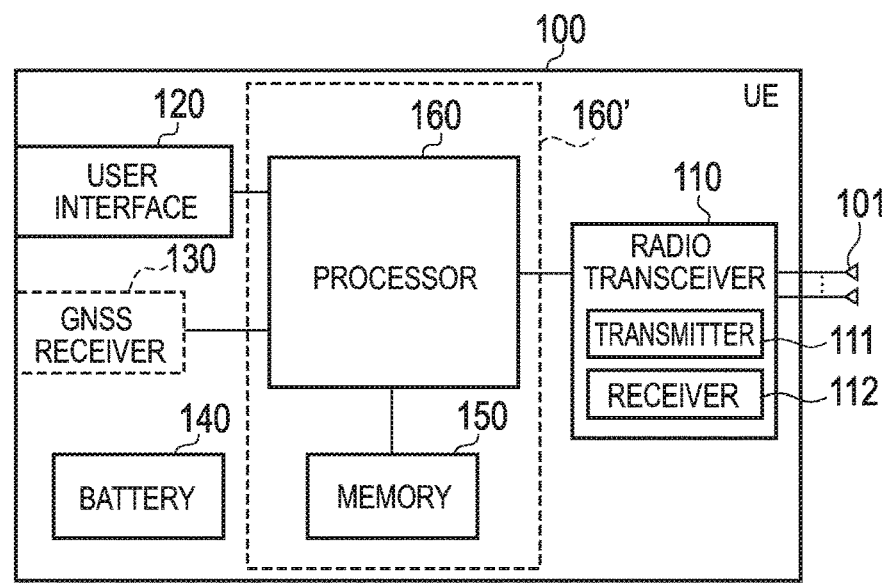
FIG. 2 is a block diagram of a UE according to the first embodiment and the second embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 configure a controller. The UE 100 may not necessarily include the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 includes a transmitter 111 that converts a baseband signal (a transmission signal) output from the processor 160 into the radio signal and transmits the radio signal from the antenna 101. Furthermore, the radio transceiver 110 includes a receiver 112 that converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various types of processes and various communication protocols described later.

Figure 3:
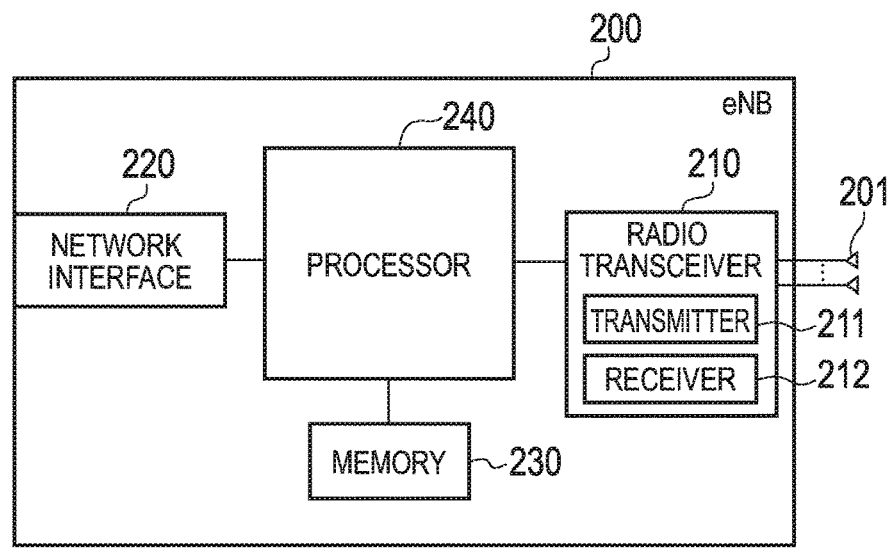
FIG. 3 is a block diagram of an eNB according to the first embodiment and the second embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 configure a controller. Furthermore, the memory 230 may be integrally formed with the processor 240, and this set (that is, a chipset) may be called a processor.

The antenna 201 and the radio transceiver 210 are used to transmit and receive a radio signal. The radio transceiver 210 includes a transmitter 211 that converts a baseband signal (a transmission signal) output from the processor 240 into the radio signal and transmits the radio signal from the antenna 201. Furthermore, the radio transmitter 210 includes a receiver 212 that converts a radio signal received by the antenna 201 into a baseband signal (a received signal), and outputs the baseband signal to the processor 240. The transmitter 211 corresponds to a radio transmitter, and the receiver 212 corresponds to a radio receiver.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various processes by executing the program stored in the memory 230. The processor 240 executes various types of processes and various communication protocols described later.

Figure 4:
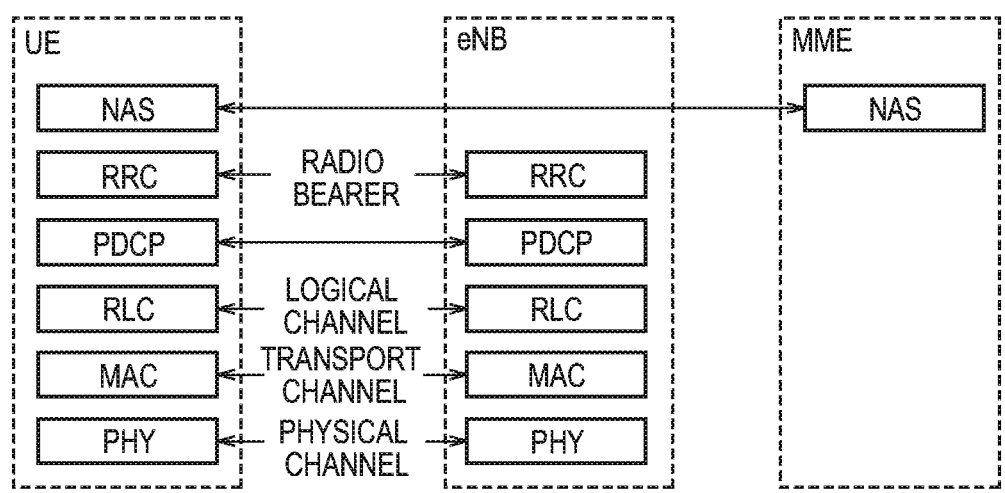
FIG. 4 is a protocol stack diagram of a radio interface according to the first embodiment and the second embodiment.

FIG. 4 is a protocol stack diagram of a radio interface in the LTE system. As shown in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), a random access procedure, and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and a resource block to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls the logical channel, the transport channel, and the physical channel according to the establishment, re-establishment, and release of a radio bearer. When there is a connection (an RRC connection) between the RRC of the UE 100 and the RRC of the eNB 200, the UE 100 is in an RRC connected state. Otherwise, the UE 100 is in an RRC idle state.

An NAS (Non-Access Stratum) layer positioned above the RRC layer performs session management, mobility management and the like.

Figure 5:
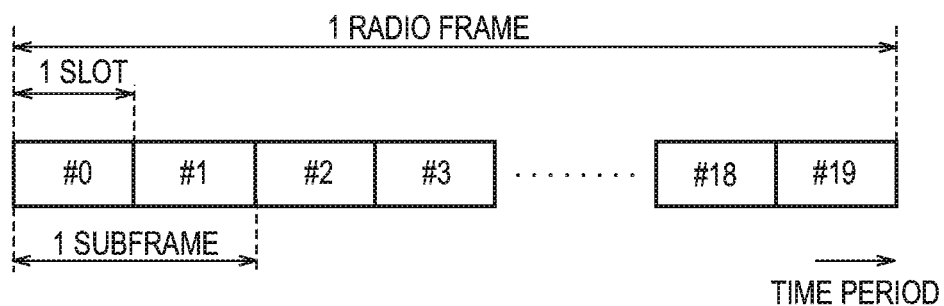
FIG. 5 is a configuration diagram of a radio frame according to the first embodiment and the second embodiment.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. Of the radio resources (time and frequency resources) assigned to the UE 100, a frequency resource can be identified by a resource block and a time resource can be identified by a subframe (or a slot).

In the downlink, an interval of several symbols at the head of each subframe is a region used as a physical downlink control channel (PDCCH) for mainly transmitting a control signal. Furthermore, the remaining interval of each subframe is a region available as a physical downlink shared channel (PDSCH) for mainly transmitting user data.

In the uplink, both ends in the frequency direction of each subframe are regions used as a physical uplink control channel (PUCCH) for mainly transmitting a control signal. The other portion in each subframe is a region available as a physical uplink shared channel (PUSCH) for mainly transmitting user data.

(Energy Saving Technology)

Figure 6:
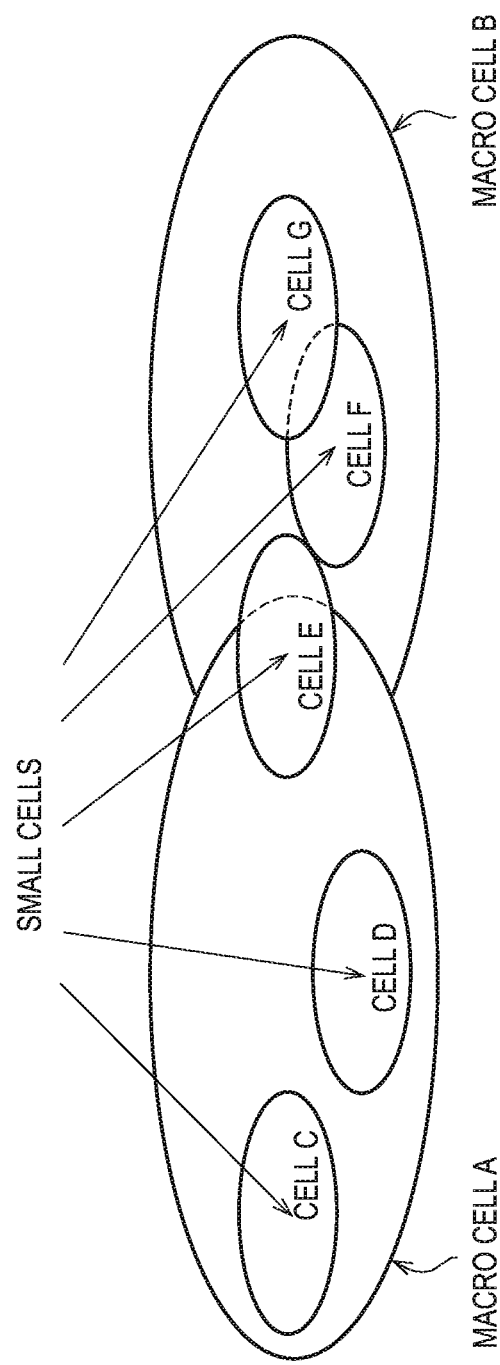
FIG. 6 is a diagram illustrating an energy saving technology according to the first embodiment and the second embodiment.

FIG. 6 is a diagram illustrating an energy saving technology according to a first embodiment. In the LTE system according to the first embodiment, a power saving (energy saving) technology, which reduces the power consumption of a network, is introduced.

As illustrated in FIG. 6, in a network configuration (the so-called HetNet) in which a plurality of small cells C through G are arranged within coverages of macro cells A and B, the small cells are selectively set to the power saving mode or normal mode in response to the traffic status. The small cell is a cell having a smaller coverage than the macro cell, and is a pico cell or a femto cell, for example.

For example, if the traffic load of the macro cell is high, the plurality of small cells that operate in the power saving mode are selectively set to the normal mode. Here, in order to operate the network effectively, in cases where there exist a plurality of small cells that operate in the power-saving mode, it is desirable to set, to the normal mode, only the small cell that exists in the proximity to the UE 100 establishing a connection with the macro cell.

(Communication Control Method According to the First Embodiment)

Figure 7:
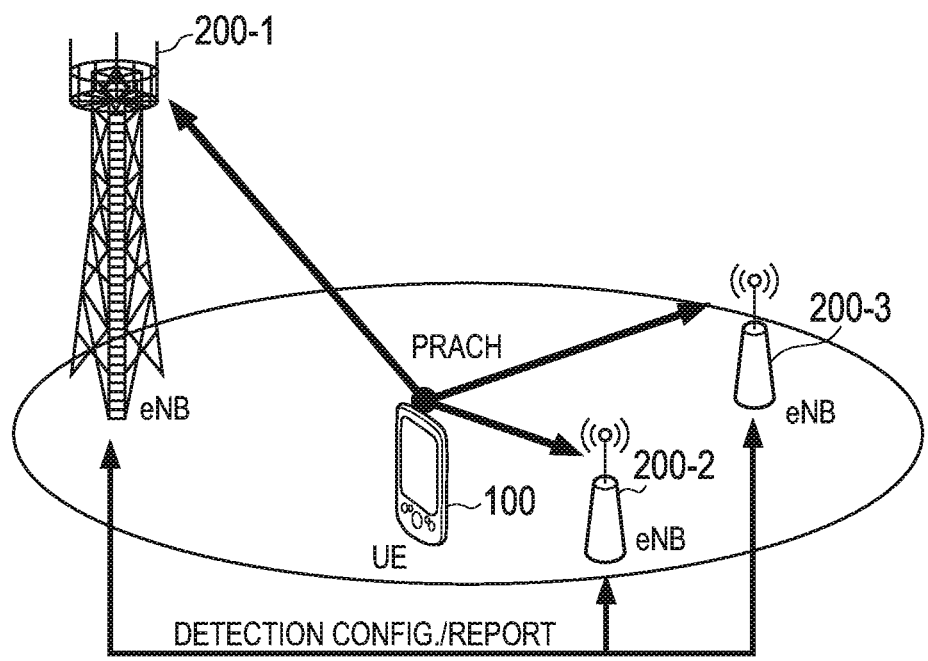
FIG. 7 is a diagram illustrating an operation environment according to the first embodiment and the second embodiment.

FIG. 7 is a diagram illustrating an operation environment according to the first embodiment. As illustrated in FIG. 7, the eNB 200-1 is a macro cell base station that manages the macro cell. The UE 100 that exists in the macro cell is connected to the eNB 200-1.

The eNB 200-2 and the eNB 200-3 are small-cell base stations that manage the small cells. The eNB 200-2 and the eNB 200-3 are positioned in the neighborhood of the eNB 200-1. Specifically, the coverage of the small cell managed by each of the eNB 200-2 and the eNB 200-3 overlaps at least a part of the coverage of the macro cell.

In the first embodiment, each small cell is set to the power saving mode. For example, each of the eNB 200-2 and the eNB 200-3 set at least the transmitter 211 in the OFF state, and stop (that is, set off-air) the transmission of the radio signal. Hereinafter, mainly an operation of the eNB 200-2 is explained as a representation of the eNB 200-2 and the eNB 200-3 that operate in the power saving mode.

The communication control method according to the first embodiment (the threshold setting method) is used in the eNB 200-2 that operates in the power saving mode.

The communication control method according to the first embodiment includes a step of setting a threshold by the eNB 200-2, a step of receiving, by the eNB 200-2, an uplink signal transmitted by the UE 100 connected to a neighboring eNB 200-1, and a step of starting, by the eNB 200-2, a process of transitioning from the power saving mode to the normal mode in response to that the received power of the uplink signal exceeds the threshold. Thus, the threshold is a detection threshold for determining whether or not a neighboring UE 100 exists. Hereinafter, the threshold is called a received power threshold.

In the step of setting the received power threshold, the eNB 200-2 sets the received power threshold on the basis of the information received from the neighboring eNB 200-1.

Thus, as compared to a case in which a fixed received power threshold is set beforehand, the received power threshold can be made variable in response to the status of the eNB 200-1, and therefore, the sensitivity of detecting a neighboring UE 100 can be modified adaptively.

The communication control method according to the first embodiment further includes a step of receiving, by the eNB 200-2, the threshold designation information for designating the received power threshold, from a neighboring eNB 200-1. In the step of setting the received power threshold, the eNB 200-2 sets the received power threshold on the basis of the threshold designation information received from the neighboring eNB 200-1.

Thus, the eNB 200-1 can control the sensitivity of detecting the neighboring UE 100.

The communication control method according to the first embodiment further includes a step of determining, by the eNB 200-2, whether or not the threshold designation information is accepted, and a step of transmitting, to the neighboring eNB 200-1, the configuration information for an uplink signal that can be applied to the UE 100, when it is determined that the threshold designation information is accepted.

Thus, after making an appropriate setting for the UE 100, the eNB 200-1 can transmit the uplink signal to the UE 100.

In the first embodiment, the eNB 200-2 may determine whether accept the threshold designation information, and transmit a response indicating result of determination (e.g., ACK in case of the result is OK, and NACK in case of the result is NG) to the neighboring base station (200-1).

In the first embodiment, the uplink signal is any one of a random access preamble, a sounding reference signal (SRS), and a demodulation reference signal (DMRS). Alternatively, in a case in which IoT (Interference-over-thermal) is measured, the uplink signal may be a PUSCH signal or a PUCCH signal. Hereinafter, mainly a case in which the uplink signal is a random access preamble will be explained. The random access preamble is transmitted over a physical random access channel (PRACH).

(Operation Sequence According to the First Embodiment)

Figure 8:
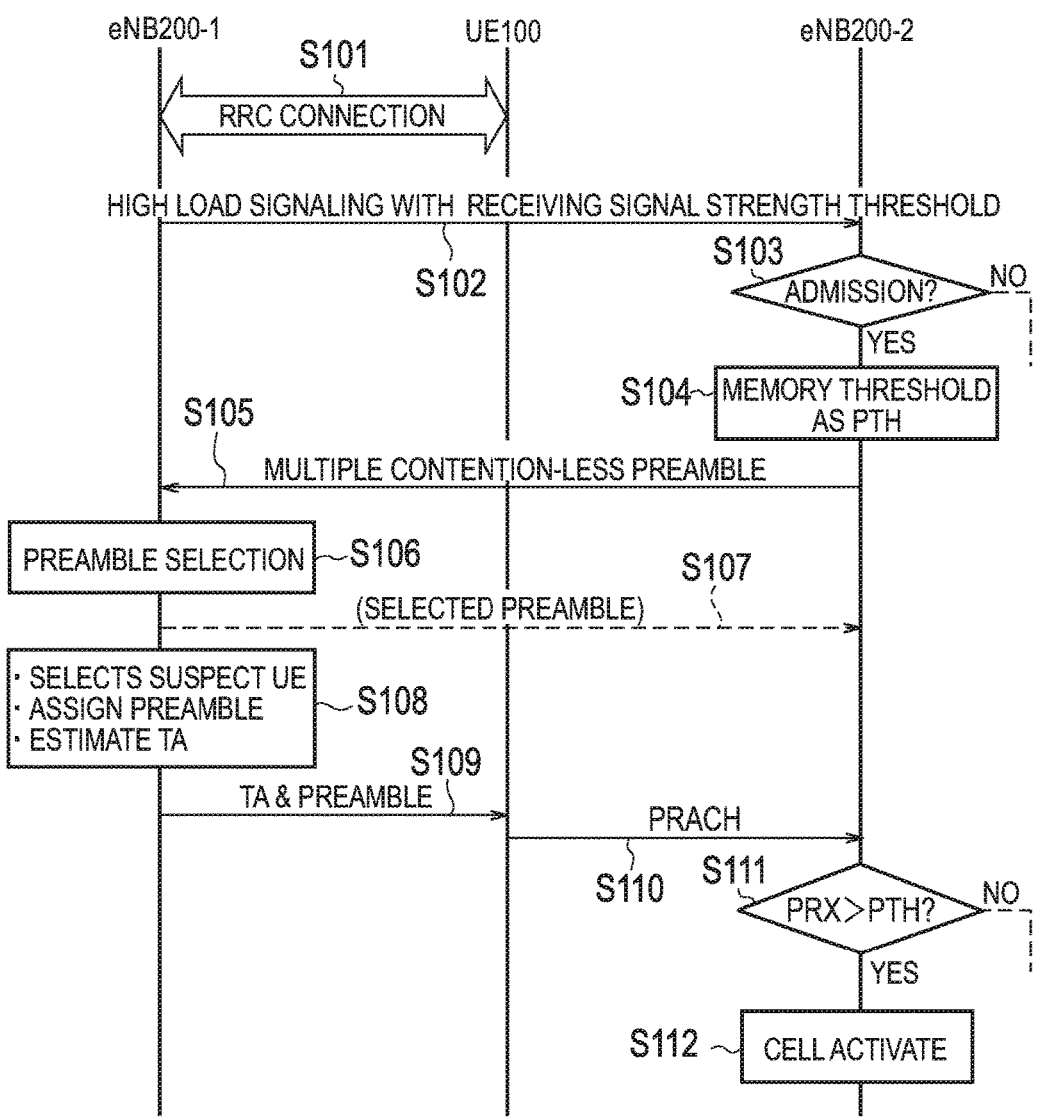
FIG. 8 is a sequence diagram illustrating an operation sequence according to the first embodiment.

FIG. 8 is a sequence diagram illustrating an operation sequence according to the first embodiment.

As illustrated in FIG. 8, in step S101, the UE 100 establishes an RRC connection with the eNB 200-1.

In step S102, the eNB 200-1 detects that the load level of the eNB 200-1 is high. The eNB 200-1 transmits the threshold designation information for designating the received power threshold (Receiving signal strength threshold) to the eNB 200-2. The eNB 200-1 may also include the threshold designation information in the high load notification (High load signaling) concerning the load level of the eNB 200-1, and transmit this information. The eNB 200-2 receives the threshold designation information from the eNB 200-1. Note that the eNB 200-1 must preferably decide the received power threshold in response to the load level of the eNB 200-1. For example, by reducing the received power threshold as the load level of the eNB 200-1 increases, the detection sensitivity of the UE 100 can be increased. Alternatively, the eNB 200-1 may decide the received power threshold in response to the transmission power of the UE 100. For example, by increasing the received power threshold as the transmission power of the UE 100 increases, the detection accuracy of the neighboring UE 100 can be set appropriately.

In step S103, the eNB 200-2 determines whether or not to accept the threshold designation information. For example, the eNB 200-2 determines that the threshold designation information is not accepted when the eNB 200-2 is not equipped with a receiver having a PRACH transmission frequency (or when the receiver has failed). When the eNB 200-2 does not accept the threshold designation information, the processing ends. Here, the explanation is provided under the assumption that the eNB 200-2 accepts the threshold designation information.

In step S104, the eNB 200-2 stores the received power threshold designated by the threshold designation information.

In step S105, the eNB 200-2 transmits, to the eNB 200-1, the configuration information for the random access preamble that can be applied to the UE 100. The configuration information includes information indicating a set of non-contention based random access preambles (contention-less preambles) that can be used by the eNB 200-2. The eNB 200-1 receives the configuration information.

In step S106, from the set of the non-contention based random access preambles that can be used by the eNB 200-2, the eNB 200-1 selects the non-contention based random access preamble to be set in the UE 100. For example, the eNB 200-1 selects a non-contention based random access preamble that can be used commonly between the eNB 200-2 and the eNB 200-3.

In step S107, the eNB 200-1 notifies the eNB 200-2 of the selected non-contention based random access preamble. It is noted that the step S107 is not essential and thus may be omitted.

In step S108, from among the plurality of UEs 100 connected to the eNB 200-1, the eNB 200-1 selects the UE 100 candidate close to the eNB 200-2, and decides to assign the non-contention based random access preamble to the selected UE 100. Moreover, the eNB 200-1 may estimate the adjustment value (TA: Timing advance) for adjusting the timing of transmission of the non-contention based random access preamble by the UE 100.

In step S109, the eNB 200-1 sets the non-contention based random access preamble (and the TA) in the UE 100.

In step S110, the UE 100 transmits the set non-contention based random access preamble. The eNB 200-2 receives the non-contention based random access preamble transmitted from the UE 100, and measures the received power of the non-contention based random access preamble.

In step S111, the eNB 200-2 compares the received power of the non-contention based random access preamble with the received power threshold stored in step S104. When the received power exceeds the received power threshold, the eNB 200-2 determines that the UE 100 from which the non-contention based random access preamble is transmitted is located in the neighborhood. Here, the explanation is provided under the assumption that the received power exceeds the received power threshold.

In step S112, the eNB 200-2 starts the process for transitioning from the power saving mode to the normal mode. For example, the eNB 200-2 switches the transmitter 211 from the OFF state to the ON state (switch ON), and starts the transmission of the radio signal (such as a cell-specific reference signal). The state in which the transmitter 211 is turned ON corresponds to the state of normal operation (normal mode). Alternatively, after the eNB 200-2 sends a notification to the eNB 200-1, the eNB 200-2 may wait for an order from the eNB 200-1, and then switch the transmitter 211 from the OFF state to the ON state.

[First Modification of the First Embodiment]

In the first embodiment described above, a case in which the eNB 200-1 directly controls the received power threshold was illustrated. However, the eNB 200-1 may control the received power threshold even indirectly.

The communication control method according to a modification of the first embodiment further includes a step of receiving, by the eNB 200-2, the load information that indicates a load status of the eNB 200-1, from the eNB 200-1. In the step of setting the received power threshold, the eNB 200-2 sets the received power threshold on the basis of the load information received from the eNB 200-1. For example, by reducing the received power threshold as the load level of the eNB 200-1 increases, the detection sensitivity of the UE 100 can be increased.

[Second Modification of the First Embodiment]

In the first embodiment described above, a case in which a plurality of small cells that operate in the power saving mode are selectively set to the normal mode when the traffic load of the macro cell is high was illustrated. Here, the threshold for determining that the traffic load is high (load threshold) may be set by OAM (Operation Administration and Maintenance). OAM corresponds to maintenance and monitoring equipment.

Figure 9:
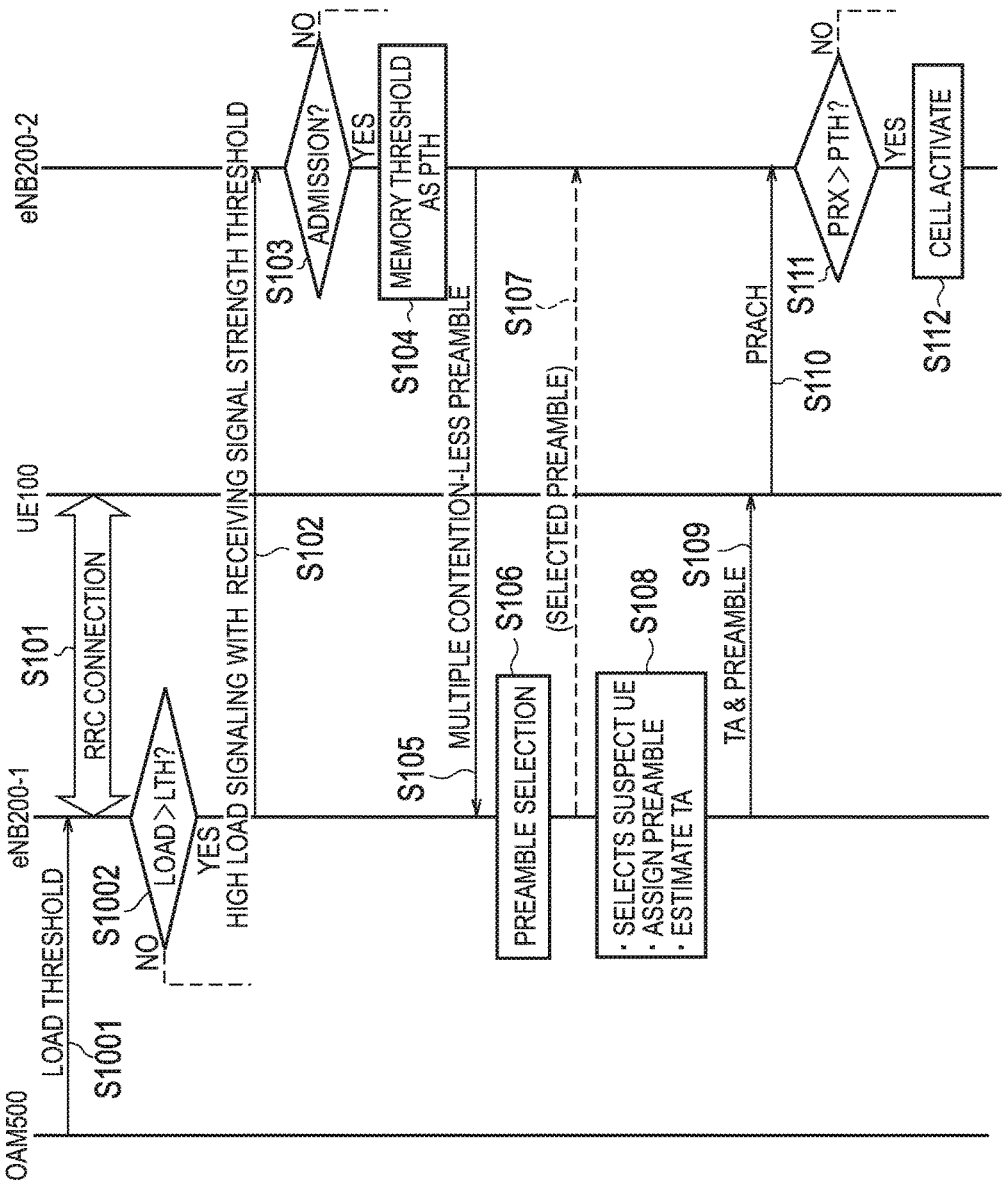
FIG. 9 is a sequence diagram illustrating an operation sequence according to a second modification of the first embodiment.

FIG. 9 is a sequence diagram illustrating an operation sequence according to a second modification of the first embodiment. Here, the differences from the sequence diagram illustrated in FIG. 8 are described.

As illustrated in FIG. 9, in step S1001, the OAM 500 transmits a load threshold (LTH) to the eNB 200-1. The eNB 200-1 receives the load threshold, and stores the received load threshold.

In step S1002, the eNB 200-1 monitors the load level of the eNB 200-1 and determines whether or not the load level exceeds the load threshold. The load level is either the usage rate of the radio resource in a cell (the macro cell) of the eNB 200-1, or the hardware load of the eNB 200-1. If the load level of the eNB 200-1 exceeds the load threshold, the processing proceeds to step S102. The operation hereafter is the same as the first embodiment described above.

[Second Embodiment]

Hereinafter, the second embodiment will be described while focusing on differences from the first embodiment. A system configuration and an operation environment according to the second embodiment are the same as those in the first embodiment.

(Communication Control Method According to the Second Embodiment)

(1) eNB 200-2

A communication control method (an uplink signal detection method) according to the second embodiment is used in the eNB 200-2 including a transmitter 211 and a receiver 212.

The communication control method according to the second embodiment includes a step of operating the eNB 200-2 in a first power saving mode in which both the transmitter 211 and the receiver 212 are set to an OFF state, a step of transitioning the eNB 200-2 to a second power saving mode in which the receiver 212 is set to an ON state while the transmitter 211 is maintained in the OFF state, and a step of determining, by the eNB 200-2, whether or not the uplink signal transmitted from the UE 100 connected to the eNB 200-1 is received by the receiver 212.

Here, the power consumption of the eNB 200-2 is less in the first power saving mode than the second power saving mode. The second power saving mode is the power saving mode in which the detection of a neighboring UE 100 is enabled. Thus, by appropriately segregating the first power saving mode and the second power saving mode, the detection of the neighboring UE 100 is enabled while aiming at power saving.

The communication control method according to the second embodiment further includes a step of starting, by the eNB 200-2, a process of transitioning to a normal mode in which both the transmitter 211 and the receiver 212 are set to an ON state, when it is determined that the receiver 212 has received the uplink signal.

Thus, by transitioning to the normal mode when a neighboring UE 100 is detected, an appropriate cell activation (switch ON) can be performed.

The communication control method according to the second embodiment further includes a step of receiving, by the eNB 200-2, the trigger information for transitioning to the second power saving mode, from the eNB 200-1. In the step of transitioning to the second power saving mode, the eNB 200-2 transitions to the second power saving mode in response to the reception of the trigger information.

Thus, for example, in response to the transmission of the uplink signal to the UE 100 by the eNB 200-1, the eNB 200-1 can cause the eNB 200-2 to transition to the second power saving mode, and set the neighboring UE 100 to a detectable state.

In the second embodiment, the trigger information is any one of information for requesting the start of reception of the uplink signal; information for requesting the switch of the receiver 212 to the ON state; and configuration information for the uplink signal.

In the second embodiment, the uplink signal is any one of a random access preamble, a sounding reference signal (SRS), and a demodulation reference signal (DMRS). Hereinafter, mainly a case in which the uplink signal is a random access preamble will be explained. The random access preamble is transmitted over a physical random access channel (PRACH).

(2) eNB 200-1

The communication control method according to the second embodiment (the preamble transmission control method) is used in the eNB 200-1 connected to the UE 100.

The communication control method according to the second embodiment includes a step of transmitting, by the eNB 200-1, to the UE 100, a preamble transmission order for ordering the transmission of a random access preamble to enable the detection of the UE 100 by the eNB 200-2 that operates in the power saving mode, and a step of transmitting, by the eNB 200-1, to the UE 100, a random access response corresponding to the random access preamble even when a random access preamble is not received from the UE 100.

According to the current specifications, until the UE 100 receives a normal random access response, the UE 100 repeats the transmission of the random access preamble while raising the transmission power. As described above, the eNB 200-2 that operates in the power saving mode does not transmit a random access response. Thus, by transmitting the random access response to the UE 100, the eNB 200-1 can stop the transmission of the random access preamble.

The communication control method according to the second embodiment further includes a step of determining, by the eNB 200-1, whether or not the random access preamble is received.

The step of determining includes a step of receiving, from the eNB 200-2, the notification information indicating that the eNB 200-2 has received the random access preamble, and a step of determining that the random access preamble has not been received when the random access preamble has not been received from the UE 100 at the time of the reception of the notification information.

Alternatively, the step of determining includes a step of clocking the time that has elapsed since the transmission of the preamble transmission order, and a step of determining that the random access preamble is not received when the random access preamble is not received until the elapsed time reaches a predetermined time. The predetermined time is the time corresponding to a window width until a point of time when the UE 100 is expected to transmit a random access response.

The communication control method according to the second embodiment further includes a step of receiving, by the eNB 200-1, from the eNB 200-2, the information indicating a set of non-contention based random access preambles that can be used by the eNB 200-2, and a step of selecting, by the eNB 200-1, any one of the non-contention based random access preambles from the set. In the step of transmitting a preamble transmission order, the eNB 200-1 transmits, to the UE 100, the preamble transmission order including information indicating the selected non-contention based random access preamble.

The communication control method according to the second embodiment further includes a step of receiving, by the eNB 200-1, from the eNB 200-2, the notification information indicating the reception of the random access preamble by the eNB 200-2, and a step of transmitting, by the eNB 200-1, to the eNB 200-2, the request information for transitioning the eNB 200-2 to the normal mode on the basis of the notification information.

(Operation Sequence According to Second Embodiment)

Figure 10:
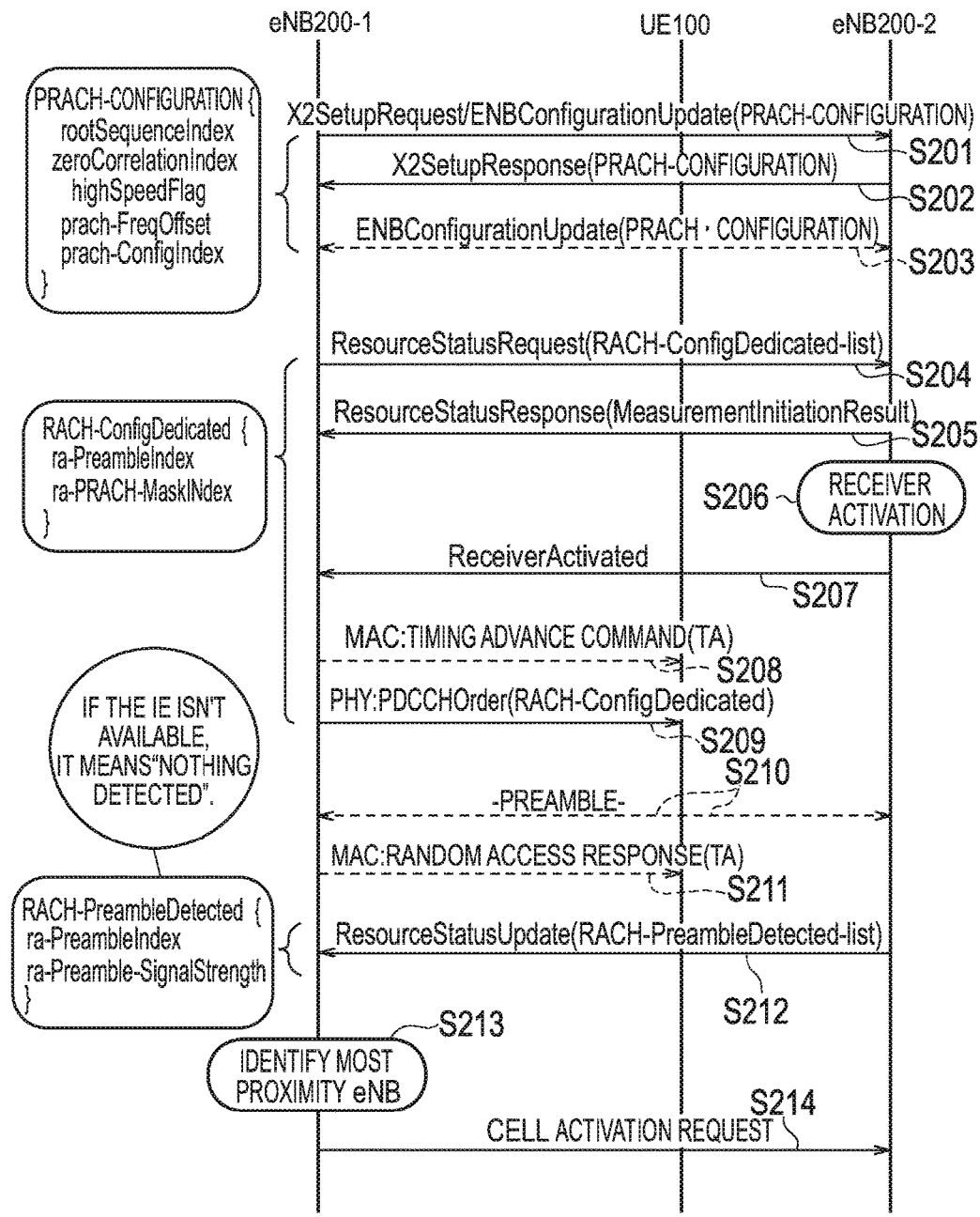
FIG. 10 is a sequence diagram illustrating an operation sequence according to the second embodiment.

FIG. 10 is a sequence diagram illustrating an operation sequence according to the second embodiment. In the initial state, the eNB 200-2 operates in the first power saving mode in which both the transmitter 211 and the receiver 212 are set to an OFF state.

As illustrated in FIG. 10, in step S201 through S203, the eNB 200-1 performs a process of acquiring, from the eNB 200-2, the configuration information of PRACH (the PRACH configuration) in the eNB 200-2. The configuration information of PRACH is, for example, included in the X2 Setup Response message or the eNB Configuration Update message.

On the basis of the acquired configuration information of PRACH, the eNB 200-1 selects the non-contention based random access preamble to be set in the UE 100, from the set of the non-contention based random access preambles that can be used by the eNB 200-2. For example, the eNB 200-1 selects a non-contention based random access preamble that can be used commonly between the eNB 200-2 and the eNB 200-3.

In step S204, the eNB 200-1 notifies the eNB 200-2 of (a list of) the selected non-contention based random access preambles. The list (the PRACH-ConfigDedicated-List) may be included in the Resource Status Request message. In the present sequence, the list (the PRACH-ConfigDedicated-List) corresponds to the trigger information.

In step S205, the eNB 200-2 transmits, to the eNB 200-1, a measurement start notification (Measurement Initiation Result) of the random access preamble. The measurement start notification may be included in the Resource Status Response message.

In step S206, the eNB 200-2 transitions to the second power saving mode by switching the receiver 212 from the OFF state to the ON state, and setting the receiver 212 to the ON state while maintaining the transmitter 211 in the OFF state. This results in a state in which the random access preamble can be received.

In step S207, the eNB 200-2 notifies the eNB 200-1 that the receiver 212 has been switched from the OFF state to the ON state, that is, the eNB 200-2 has transitioned to the second power saving mode.

From among the plurality of UEs 100 connected to the eNB 200-1, the eNB 200-1 selects the UE 100 candidate close to the eNB 200-2, and decides to assign the non-contention based random access preamble to the selected UE 100. Moreover, the eNB 200-1 may estimate the adjustment value (TA) for adjusting the timing of transmission of the non-contention based random access preamble by the UE 100.

In step S208, the eNB 200-1 sets the TA in the UE100 by the control command of the MAC layer. However step S208 is not essential and thus may be omitted.

In step S209, the eNB 200-1 sets the non-contention based random access preamble in the UE 100 by an order via the PDCCH.

In step S210, the UE 100 transmits the set non-contention based random access preamble. Here, the explanation is provided under the assumption that the eNB 200-2 receives the non-contention based random access preamble, and the eNB 200-1 does not receive the non-contention based random access preamble.

In step S211, the eNB 200-1 transmits, to the UE 100, a random access response corresponding to the non-contention based random access preamble even if the non-contention based random access preamble is not received from the UE 100. It is noted that the random access response is a message of the MAC layer. It is noted that the transmission timing of the non-contention based random access response is preferably within the timer period that specifies the reception standby time of the random access response in the UE 100. The UE 100 having received the random access response stops the transmission of the non-contention based random access preamble.

In step S212, the eNB 200-2 having received the non-contention based random access preambles notifies the eNB 200-1 of the (list of) the received non-contention based random access preambles. The list (the PRACH-ConfigDedicated-List) includes the information of the received power of the non-contention based random access preamble. The list (the PRACH-ConfigDedicated-List) may be included in the Resource Status Update message. It is noted that if the eNB 200-2 does not receive the non-contention based random access preamble, the eNB 200-2 may not include the list in the Resource Status Update message, or may set a null value (a disabled value).

In step S213, the eNB 200-1 designates the eNB that is closest to the UE 100 (the eNB 200-2 or the eNB 200-3) on the basis of the list. For example, the eNB that receives the non-contention based random access preamble from the UE 100 with the highest received power is designated as the eNB closest to the UE 100. Here, an explanation is provided under the assumption that the eNB 200-2 is designated as the eNB closest to the UE 100.

In step S214, the eNB 200-1 transmits, to the eNB 200-2, an activation request (a Cell Activation Request) for causing the eNB 200-2 to transition to the normal mode. The eNB 200-2 having received the activation request transitions to the normal mode.

[Modification of Second Embodiment]

Figure 11:
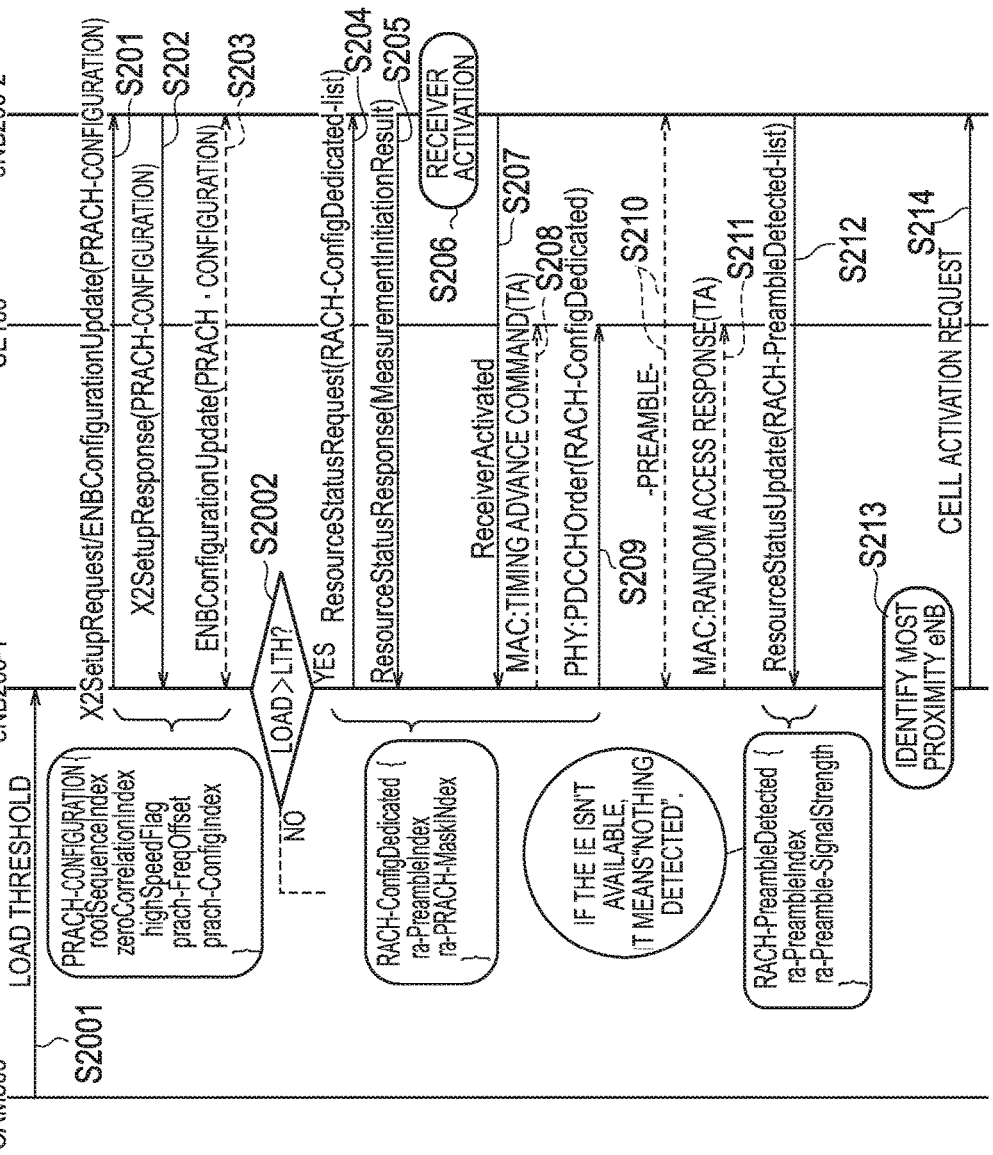
FIG. 11 is a sequence diagram illustrating an operation sequence according to a modification of the second embodiment.

FIG. 11 is a sequence diagram illustrating an operation sequence according to a modification of the second embodiment. Here, the differences from the sequence diagram illustrated in FIG. 10 are described.

As illustrated in FIG. 11, in step S2001, the OAM 500 transmits a load threshold (LTH) to the eNB 200-1. The eNB 200-1 receives the load threshold, and stores the received load threshold.

In step S2002, the eNB 200-1 monitors the load level of the eNB 200-1 and determines whether or not the load level exceeds the load threshold. The load level is either the usage rate of the radio resource in a cell (the macro cell) of the eNB 200-1, or the hardware load of the eNB 200-1. If the load level of the eNB 200-1 exceeds the load threshold, the processing proceeds to step S204. The operation hereafter is the same as the second embodiment described above.

[Other Embodiments]

It is preferable to implement the first embodiment and the second embodiment described above in combination with each other rather than separately and independently. For example, the communication control method according to the second embodiment can be applied even to an operation sequence according to the first embodiment.

Moreover, in the first embodiment and the second embodiment described above, a case in which the eNB 200-1 manages a macro cell, and the eNB 200-2 and eNB 200-3 manage a small cell, respectively, was illustrated. However, the eNB 200-1 may manage a pico cell, and the eNB 200-2 and eNB 200-3 may manage a femto cell, respectively.

In the first embodiment and the second embodiment described above, although an LTE system is described as an example of a mobile communication system, the present invention is not limited to the LTE system, and may be applied to a system other than the LTE system.

[Additional Statement 1]

Hereinafter, additional statements of the aforementioned embodiments will be described.

1. Introduction

Three solutions for switch on enhancement were captured, i.e.;

Solution 1: UE detection of DL signalling from the hotspot cell

Solution 2: IOT measurement by the hotspot cell

Solution 3: Detection of UL signals by the hotspot cell

At the same time, several open issues on the solutions. As for solution 3, the issues were captured below;

Issue 1: It needs to be discussed whether this mechanism needs to change UE behaviour.

Issue 2: The operational state of the hotspot cell needs to be clarified.

Issue 3: What is the advantage compared to solution 1 in terms of energy saved and speed of detecting the right hotspot cell.

In this Additional statement, we would provide the analysis of open issues for solution 3.

2. Description 2.1. UL Signals Used in Solution 3

Solution 3 was originally proposed as CB-HetNet-ICIC solution 1c-1e. The word "UL signals" was intended;

1. Random access preambles on coverage cell PRACH resources

2. SRS (Sounding Reference Signal)

3. Demodulation reference signal (DM-RS).

Observation 1: UL signals for solution 3 intend existing three signals.

2.2. Analysis of Issues

Whether or not solution 3 will support all of the three signals above, the issues can be analyzed.

2.2.1. Issue 1

The issue 1 is as follows;

Issue 1: It needs to be discussed whether this mechanism needs to change UE behavior.

Solution 3 will use existing UL signals, PRACH, SRS and/or DM-RS. The UE behavior is categorized into two phases, configuration phase and transmission phase.

In the configuration phase, eNB configures UE parameters to transmit the UL signals. It may include resource allocations (time/frequency), sequences and so on. Obviously the UL signals exist in current standards and UE transmits the UL signal(s) complying to the standards. In addition, the hotspot cells should detect the standard-complying signals for switch on enhancement. Therefore, solution 3 don't need to change any UE behavior.

Observation 2: If solution 3 was designed under complying current UE behavior, issue 1 was not problem anymore.

Proposal 1: Solution 3 should be designed under complying current UE behavior.

2.2.2. Issue 2

The open issue 2 is as follows;

Issue 2: The operational state of the hotspot cell needs to be clarified.

The word "operational state" can be divided into two categories, power domain and time/frequency domain.

The power domain status means whether Tx chain or Rx chain should be activated. Obviously solution 3 needs to activate RX chain in the hotspot cell to detect UL signals but Tx chain including power amplifiers doesn't need since it just detects UL signals from UEs. In other words, the status of the hotspot cell can be called "Listening" or "Partial activated".

Observation 3: Solution 3 needs the hotspot cell(s) to activate RX chain but can maintain Tx chain deactivated.

The time/frequency domain status means whether or not it needs synchronization between the coverage cell and the hotspot cells. In case to use SRS for solution 3, we have already known it needs synchronization between eNBs for reliable detection. We guess the same assumption can be adopted for using DM-RS. On the other hands, in case to use PRACH, there is no requirement for inter-eNB synchronization, while it can facilitate easier detection to assume synchronization.

For inter-eNB synchronization, a lot of methods have been introduced in practical network, e.g. GPS, IEEE 1588 and/or air synchronization methods. While the methods can provide precise clock-level synchronizations, solution 3 needs more rough accuracy for reliable and/or easier detection of UL signals, i.e. subframe-level synchronization, because precise information can be resumed from the UL signals. In case of considering subframe-level synchronizations, an air synchronization method without any standard changes can be adopted for solution 3, i.e. the hotspot cell listens UL signals or DL PSS/SSS. It can fall into implementation matter.

Observation 4: Solution 3 using SRS needs inter-eNB synchronization, while it's not mandatory if PRACH is used.

Observation 5: The requirements of synchronization accuracy is rough, so simpler implementation techniques can be adopted for solution 3.

Proposal 3: In solution 3, the hotspot cell is in listening status, meaning to activate RX chain and to need an implementation synchronization method.

2.2.3. Issue 3

The open issue 3 is as follows;

Issue 3: What is the advantage compared to solution 1 in terms of energy saved and speed of detecting the right hotspot cell.

As already identified, solution 1 causes DL interferences during proximity UE detection. It's a critical problem because the coverage cell experiences own overloads (therefore it wants to activate the hotspot cells now) and DL congestion is more frequently seen than UL in general. As for UL, the UL signals used in solution 3 can be allocated dedicated radio resources by the coverage cell. Therefore the UL signals can be received orthogonally at the coverage cell.

Observation 6: Solution 3 is the interference-free mechanism in DL as well as in UL.

From the perspective of additional energy consumptions for proximity UE detection, solution 3 don't need Tx chain activation as discussed above, while solution 1 should obviously activate Tx chain to transmit SCH/BCH/RS signals for the detection for inter-RAT solution below;

It should be noted that during the probing interval, the hotspot cell only transmits SCH/BCH/RS signals and does not accept any traffic.

As for ratio of power consumption in base stations, the power amplifier (PA) stage consumes 20-60% of base station power for example. To maintain PAs under deactivation is the most important factor for saving additional energy consumption.

Observation 7: Solution 3 is the additional power consumption-free mechanism in PA stages.

The other aspect to be considered is detection speed. Solution 1 needs about one or more minutes (at least 10 seconds) as stated in below;

The BS probing time interval X will always be less than Y. The BS probing time interval X can be an operation-specific parameter with a minimum in the range of 1 to 2 minutes, depending on the DRX cycle length.

Assume for the sake of argument that a cell has a probing time of 10 seconds but the required probing time is one minute.

On the other hand, solution 3 uses UL signals transmitted from UEs which are now communicating. Therefore, the configuration time from eNB to UE is negligible, since X2 latency over non-ideal backhaul is dominant Assuming the worst latency of 60 [ms] on DSL Access in the Small Cell study and two times round-trip over X2 according to the steps in technical report, 240+alpha [ms] can be estimated. Assuming the detection is completed by just one shot of UL signal, solution 3 is at least about 40 times faster than solution 1.

Observation 8: Solution 3 is the high speed detection method.

Proposal 4: Solution 3 has advantages in interferences, energy efficiency and detection speed comparing to Solution 1.

3. Conclusion

In this additional statements, the issues identified for switch on enhancement solution 3 have been described.

4. Annex

Solution 3: Detection of UL signals by the hotspot cell

The following issues have been identified:

Issue 1: It needs to be discussed whether this mechanism needs to change UE behavior.

Solution 3-1.1: UE behavior is not required to change.

Issue 2: The operational state of the hotspot cell needs to be clarified.

Solution 3-2.1: Rx chain in the hotspot cell should be activated and inter-eNB synchronization should be assumed. The synchronization requirements can be met by an implementation technique in case of PRACH.

Issue 3: What is the advantage compared to solution 1 in terms of energy saved and speed of detecting the right hotspot cell.

Solution 3-3.1: Additional energy consumptions for detection is significantly lower than solution 1 thanks to keeping PA in the hotspot cell deactivate. In addition, detection speed is extraordinary faster than solution 1.

[Additional Statement 2]

In the latest technical report (TR36.887 V1.2.0), three solutions for switch on enhancement were captured, i.e.; Solution 1: UE detection of DL signalling from the hotspot cell, Solution 2: IOT measurement by the hotspot cell, Solution 3: Detection of UL signals by the hotspot cell.

At the same time, several open issues on the solutions were identified. As for solution 3, the open issues were captured; Issue 1: It needs to be discussed whether this mechanism needs to change UE behaviour. Issue 2: The operational state of the hotspot cell needs to be clarified. Issue 3: What is the advantage compared to solution 1 in terms of energy saved and speed of detecting the right hotspot cell. Issue 4: What is the typical trigger for the booster cell to start proximity detection considering that the coverage cell needs to predict the need of resources? Issue 5: How much time is required in order to collect the information (order of seconds, tens of seconds, minutes or more)?

In this additional statement we would provide the analysis of open issues for solution 3.

Solution 3 was originally proposed as CB-HetNet-ICIC solution 1c-1e. The word "UL signals" was intended; 1. Random access preambles on coverage cell PRACH resources, 2. SRS (Sounding Reference Signal), 3. DM-RS.

Observation 1: UL signals for solution 3 intend existing three signals.

Whether or not solution 3 will support all of the three signals above, the open issues captured in the technical report can be analyzed.

Issue 1: It needs to be discussed whether this mechanism needs to change UE behaviour.

Solution 3 will use existing UL signals, PRACH, SRS and/or DM-RS. The UE behavior is categorized into two phases, configuration phase and transmission phase. In the configuration phase, eNB configures UE parameters to transmit the UL signals. It may include resource allocations (time/frequency), sequences and so on. Obviously the UL signals exist in current standards and UE transmits the UL signal(s) complying to the standards. In addition, the hotspot cells should detect the standard-complying signals for switch on enhancement. Therefore, solution 3 doesn't need to change any UE behaviour.

Observation 2: If solution 3 can be designed under complying current UE behaviour, issue 1 was not problem anymore.

Issue 2: The operational state of the hotspot cell needs to be clarified.

We believe the word "operational state" can be divided into two categories, power domain and time/frequency domain. The power domain status means whether the transmitter or the receiver should be activated. Obviously solution 3 needs to activate its receiver in the hotspot cell to detect the UL signals transmitted from UE, but its transmitter including power amplifiers isn't needed for the detection. In other words, the status of the hotspot cell can be called as "Listening" or "Partial activated".

Observation 3: Solution 3 needs the hotspot cell(s) to activate its receiver but can maintain its transmitter deactivated.

The time/frequency domain status means whether or not it needs synchronization between the coverage cell and the hotspot cells. In case to use SRS for solution 3, we have already known it needs synchronization between eNBs for reliable detections. We guess the same assumption can be adopted for using DM-RS. On the other hands, in case to use PRACH, there is no requirement for inter-eNB synchronization, while it can facilitate easier detection to assume synchronization.

For the inter-eNB synchronization, a lot of methods have been introduced in practical network, e.g. GPS, IEEE 1588 and/or air-synchronization. While the methods can provide precise clock-level synchronizations, solution 3 needs more rough accuracy for reliable and/or easier detection of the UL signals, i.e. subframe-level synchronization, because precise information can be resumed from the UL signal itself. In case of considering subframe-level synchronizations, an air-synchronization method without any standard changes can be adopted for solution 3, i.e. the hotspot cell listens the UL signals or DL PSS/SSS. It can fall into implementation matter.

Observation 4: Solution 3 using SRS needs inter-eNB synchronization, while it's not mandatory if PRACH is used.

Observation 5: The requirements of synchronization accuracy is rough, so simpler implementation techniques can be adopted for solution 3.

Issue 3: What is the advantage compared to solution 1 in terms of energy saved and speed of detecting the right hotspot cell.

As already identified, solution 1 causes DL interferences during the proximity UE detection. It's a critical problem because the coverage cell experiences own overloads (therefore it wants to activate the hotspot cells now) and also DL congestions are more frequently seen than UL in general. As for UL, the UL signals used in solution 3 can be allocated dedicated radio resources by the coverage cell. Therefore the UL signals can be received orthogonally at the coverage cell. Thus, it doesn't waste any energy caused by additional DL transmissions due to the interferences.

Observation 6: Solution 3 doesn't waste energy due to the interference in DL.

From the perspective of additional energy consumptions for the proximity UE detection, solution 3 don't need to activate the transmitter in the hotspot cell(s) as discussed above, while solution 1 should obviously activate its transmitter to generate SCH/BCH/RS signals for the detection as described for inter-RAT solution below; It should be noted that during the probing interval, the hotspot cell only transmits SCH/BCH/RS signals and does not accept any traffic. As for the ratio of power consumption in base stations, the power amplifier (PA) stage consumes 20-60% of base station power for example To maintain PAs under deactivation is the most important factor for saving additional energy consumption.

Observation 7: Solution 3 is the additional power consumption-free mechanism in PA stages.

The other aspect to be considered is the speed of detection. Solution 1 needs about one or more minutes (at least 10 seconds) as stated below; The BS probing time interval X will always be less than Y. The BS probing time interval X can be an operation-specific parameter with a minimum in the range of 1 to 2 minutes, depending on the DRX cycle length as specified in TS 25.133 and TS 36.133. Assume for the sake of argument that a cell has a probing time of 10 seconds but the required probing time is one minute. On the other hand, solution 3 needs less than 1 second to detect the right hotspot cell(s), as we mention the details of the estimation in the section of issue 5 below. Therefore, solution 3 is expected to achieve at least 10 times faster detection than solution 1.

Observation 8: Solution 3 is expected to achieve at least 10 times faster detection than solution 1.

Issue 4: What is the typical trigger for the booster cell to start proximity detection considering that the coverage cell needs to predict the need of resources?

Solution 3 needs to make the booster cell(s) to detect the UL signal that is transmitted from e.g. the UE(s) which causes heavy load. Thus, the coverage cell needs to inform the booster cell(s) of the UE-dedicated configurations with a new message over X2, according to the step 2 of the TR. The new message can be considered as the typical trigger for the proximity detection. As another option, an explicit indicator to start the proximity detection can be considered. The other aspect for the trigger is when the message is sent. It can be considered as a simple way that, if the load in the coverage cell is higher than a threshold then the coverage cell sends the message to the booster cell(s) to start the proximity detection. The threshold of load to trigger the proximity detection may be provided by OAM.

Observation 9: The proximity detection is typically triggered by sending a new message or an explicit indicator that is exchanged over X2AP from the coverage cell to the booster cell(s), when the load of the coverage cell is higher than a threshold which may be configured by OAM.

In case of solution 3 with PRACH, the booster cell(s) may be informed of the dedicated preamble information for specific UEs which cause heavy load in the coverage cell. While it may be used for the trigger of the proximity detection, the details are FFS.

Issue 5: How much time is required in order to collect the information (order of seconds, tens of seconds, minutes or more)?

To estimate the time to collect the information with Solution 3, we would provide the assumption for each the steps captured in the TR as follows;

Step 1: The coverage eNB determines and configures UEs for uplink transmission. The details of Step 1 are already discussed in previous section. For the determination of UEs in the coverage eNB is performed when the eNB experiences its high load. This is the start point for the proximity detection. As for the configuration of UEs, it's negligible comparing to the X2 latency with non-ideal backhaul, because the UEs, which are configured to transmit UL signals, are now communicating with the coverage cell, i.e. probably in RRC_CONNECTED, and causing the high load in the coverage cell.

Step 2: The coverage eNB sends the uplink signals configuration to the hotspot eNB by new IE on X2AP. Step 2 is considered as the dominant step in the time estimation, because X2 messages typically go through the non-ideal backhaul. According to the study on small cell enhancement, the TR mentioned that typical backhaul which was widely used in the market is xDSL and it captured the latency of DSL access as 15-60 [ms]. To take the worst case, the X2 latency of one-way message is assumed as 60 [ms] in this evaluation. While it has not been discussed whether Step 2 consists of one-way message or two-way messages, i.e. request and the response, 120 [ms] is assumed to have two-way messages for taking the worst case into account.

Step 3: The hotspot eNB detects the configured nearby UEs by monitoring the uplink signals. After detecting uplink signalling with the signalled configuration, it can use this information for switch on decisions. It can also send the detection information to the coverage eNB, over new IEs or X2-AP messages, which can make the switch-on decision and signal this to the hotspot eNB. As mentioned in the assumption for Step 1 above, the signallings over air interface can be negligible. With regard to the X2 message, it's obviously assumed in the text in the TR that one-way massage, i.e. 60 [ms], will be used to inform the coverage eNB of the result of the proximity detection.

Based on the above assumptions for each steps, the time to collect the information can be estimated as approximately 180+X [ms], where the X is a variation depending on eNB implementation matters, e.g. setup time to activate the receiver of the hotspot cell.

Note that there is actually a time variation depending on which UL signal is used, i.e. PRACH, SRS and DM-RS, so it may be included in the X above. For example in case to use SRS with frequency hopping, the hotspot cell(s) may monitor SRS during a longer period than that without frequency hopping. The time variation is estimated as at most 10 [ms].

Observation 10: Solution 3 needs 180+X [ms] for proximity detection, considering the worst case.

For more accurate estimation, the time to collect the information is calculated as follows, referring to an example of signalling flow for solution 3 with PRACH, shown in FIG. 12.

P1: Referring to Step 2 in the TR, we assume two-way messages to inform the hotspot eNB(s) of the configuration and starting the proximity detection. The request/response messages between the coverage eNB and the hotspot eNB(s)

needs two times 15-60 [ms]+a [ms], where the a is the setup time in the hotspot eNB(s) for the proximity detection, e.g. wake-up its receiver with applying the configuration received. P1 is estimated to spend 30-120 [ms]+α [ms].

P2: Referring back to Step 1 in the TR, the coverage eNB transmits PDCCH to the UEs for the uplink transmission. The time to transmit the PDCCH is within 1 [ms]. P2 is estimated to spend 1 [ms].

P3: Referring Step 3 in the TR, the time lag between the PDCCH reception and the preamble transmission is estimated as 4-14 [ms], where the time considers PDCCH decoding time and PRACH Configuration index. The hotspot eNB(s) is monitoring the UL signals continuously during the time lag, i.e. by at least the UE(s) finishes transmitting the preamble once. The time to transmit the preamble itself is within 1 [ms]. The hotspot eNB(s) informs the coverage eNB of the information by means of X2 message. The time is 15-60 [ms], due to the latency over non-ideal backhaul. P3 is estimated to spend (4-14)+1+(15-60)=20-75 [ms]

Therefore, the overall time to collect the information is estimated as from 51 [ms] to 196+α [ms], which is order of hundreds of milliseconds. Note that the cell activation procedure after P3 is out of scope of the issue 5.

Observation 11: Solution 3 with PRACH spends from 51 to 196+α[ms].

Observation 12: Solution 3 needs less than 1 second for proximity detection.

Proposal 1: It is proposed to capture the text proposal in Annex for solutions to the issues for solution 3 in the TR.

Annex: Text Proposal

Solution 3: Detection of UL signals by the hotspot cell

The following issues have been identified:

Issue 1: It needs to be discussed whether this mechanism needs to change UE behaviour.

Solution 3-1.1: UE behaviour is not required to change

Issue 2: The operational state of the hotspot cell needs to be clarified.

Solution 3-2.1: The receiver in the hotspot cell should be activated. and inter-eNB synchronization should be assumed. The synchronization requirements can be met by an implementation technique in case of PRACH.

Issue 3: What is the advantage compared to solution 1 in terms of energy saved and speed of detecting the right hotspot cell.

Solution 3-3.1: Additional energy consumptions for detection is significantly lower than solution 1 thanks to keeping PA in the hotspot cell deactivate. In addition, detection speed is extraordinary faster than solution 1.

Issue 4: What is the typical trigger for the booster cell to start proximity detection considering that the coverage cell needs to predict the need of resources?

Solution 3-3.1: When the load of the coverage cell is higher than a threshold which may be configured by OAM, the coverage cell starts proximity detection by sending the new IE on X2AP to the booster cell(s).

Issue 5: How much time is required in order to collect the information (order of seconds, tens of seconds, minutes or more)?

Solution 3-5.1: Solution 3 requires less than one second.

[CROSS REFERENCE]

The entire contents of Japanese Patent Application No. 2014-016966 (filed on Jan. 31, 2014) and U.S. Provisional Patent Application No. 61/990,970 (filed on May 9, 2014) are incorporated herein by reference.

INDUSTRIAL APPLICABILITY

The present invention is useful for communications fields such as mobile communications.

The invention claimed is:

1. A communication control method used in a base station that operates in a power saving mode, comprising steps of:
   receiving load information indicating a load status of a neighboring base station, from the neighboring base station;
   setting a threshold;
   receiving an uplink signal transmitted from a user terminal connected to the neighboring base station; and
   starting a process of transitioning from the power saving mode to a normal mode, in response to that a received power of the uplink signal exceeds the threshold, wherein
   in the step of setting the threshold, the base station sets the threshold on the basis of the load information received from the neighboring base station,
   the load information indicates a load level of the neighboring base station, and
   a value of the threshold is set to a lower value as the load level of the neighboring base station increases.

2. The communication control method according to claim 1, further comprising a step of receiving threshold designation information for designating the threshold, from the neighboring base station, wherein
   in the step of setting the threshold, the base station sets the threshold on the basis of the threshold designation information received from the neighboring base station.

3. The communication control method according to claim 2, further comprising steps of:
   determining whether or not to accept the threshold designation information; and
   transmitting configuration information for the uplink signal, which is applicable to the user terminal, to the neighboring base station, when it is determined that the threshold designation information is accepted.

4. The communication control method according to claim 2, further comprising steps of determining whether accept the threshold designation information, and transmitting a response indicating result of determination to the neighboring base station.

5. The communication control method according to claim 1, wherein the uplink signal is any one of a random access preamble, a sounding reference signal, and a demodulation reference signal.

6. A base station that operates in a power saving mode, comprising:
   a receiver configured to receive load information indicating a load status of a neighboring base station, from the neighboring base station, and receive an uplink signal transmitted from a user terminal connected to the neighboring base station; and
   a controller configured to start a process of transitioning from the power saving mode to a normal mode, in response to that a received power of the uplink signal exceeds a threshold, wherein
   the controller sets the threshold on the basis of the load information on the neighboring base station,
   the load information indicates a load level of the neighboring base station, and
   a value of the threshold is set to a lower value as the load level of the neighboring base station increases.

7. A communication control method used in a base station to which a user terminal connects, comprising steps of:
   transmitting, to the user terminal, a preamble transmission order for ordering a transmission of a random access preamble so that a neighboring base station operating in a power saving mode is capable of detecting the user terminal;

determining whether or not the random access preamble has been received from the user terminal; and transmitting, to the user terminal, a random access response corresponding to the random access preamble even when determining that the random access preamble has not been received from the user terminal, wherein the step of determining comprises a step of receiving, from the neighboring base station, notification information indicating that the neighboring base station has received the random access preamble; and determining that the random access preamble has not been received when the random access preamble has not been received at a time when the notification information is received at the base station.

8. The communication control method according to claim 7, further comprising a step of determining whether or not the random access preamble has been received, wherein the step of determining comprises steps of:

clocking a time that has elapsed since the transmission of the preamble transmission order, and determining that the random access preamble has not been received when the random access preamble has not been received until the elapsed time reaches a predetermined time.

9. The communication control method according to claim 7, further comprising steps of:

receiving, from the neighboring base station, information indicating a set of non-contention-based random access preambles usable by the neighboring base station; and selecting any non-contention-based random access preamble from the set, wherein in the step of transmitting the preamble transmission order, the base station transmits the preamble transmission order including information indicating the selected non-contention-based random access preamble, to the user terminal.

10. The communication control method according to claim 7, further comprising step of:

transmitting, to the neighboring base station, request information for causing the neighboring base station to transition to a normal mode on the basis of the notification information.

11. A base station to which a user terminal connects, comprising:

a transmitter configured to transmit, to the user terminal, a preamble transmission order for ordering a transmission of a random access preamble so that a neighboring base station operating in a power saving mode is capable of detecting the user terminal; and a controller configured to perform control to determine whether or not the random access preamble has been received from the user terminal, so that a random access response corresponding to the random access preamble is transmitted to the user terminal, even when determining that the random access preamble has not been received from the user terminal, wherein the step of determining comprises a step of receiving, from the neighboring base station, notification information indicating that the neighboring base station has received the random access preamble; and determining that the random access preamble has not been received when the random access preamble has not been received at a time when the notification information is received at the base station.

\* \* \* \* \*